(12) United States Patent
Chen et al.

(10) Patent No.: US 7,580,253 B1
(45) Date of Patent: Aug. 25, 2009

(54) RETAINING APPARATUS FOR DISK DRIVE

(75) Inventors: Yun-Lung Chen, Taipei Hsien (TW); Gang Su, Shenzhen (CN); Wan-Cheng Lin, Taipei Hsien (TW); Ling-Xin Zeng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/170,141

(22) Filed: Jul. 9, 2008

(30) Foreign Application Priority Data

Apr. 18, 2008 (CN) .................... 2008 2 0300586 U

(51) Int. Cl.
*H05K 5/00* (2006.01)
*H05K 7/00* (2006.01)

(52) U.S. Cl. ........................... 361/679.33; 361/679.34; 361/679.35; 361/679.37; 361/679.39

(58) Field of Classification Search ................ 361/685, 361/679.33, 679.34, 679.35, 679.37, 679.39
See application file for complete search history.

(56) References Cited

U.S. PATENT DOCUMENTS

| | | | | |
|---|---|---|---|---|
| 5,587,889 A | * | 12/1996 | Sacherman | 361/809 |
| 5,599,080 A | * | 2/1997 | Ho | 312/334.7 |
| 6,256,204 B1 | * | 7/2001 | Wormsbecher et al. | 361/727 |
| 6,275,377 B1 | * | 8/2001 | Liu et al. | 361/685 |
| 6,330,147 B1 | * | 12/2001 | Adams et al. | 361/679.37 |
| 6,418,012 B1 | * | 7/2002 | Dials et al. | 361/679.35 |
| 6,535,390 B1 | * | 3/2003 | Lo | 361/726 |
| 6,580,607 B1 | * | 6/2003 | Feldmeyer | 361/685 |
| 6,631,536 B2 | * | 10/2003 | Feldmeyer | 16/422 |

* cited by examiner

*Primary Examiner*—Jayprakash N Gandhi
*Assistant Examiner*—Quinn Hunter
(74) *Attorney, Agent, or Firm*—D. Austin Bonderer

(57) ABSTRACT

A retaining member (50) is used for locking a drive (30) within a housing. The retaining member includes a drive, a housing and a pair of wire members (51) and a pair of latch members (53). The wire members are formed of resilient material and are attached to opposite sides of the drive. The latch member includes a securing portion (531) and a flexible locking portion (533). The locking portion extends from the securing portion and away from the drive. A locking tab (5331) is formed on the locking portion that engages the housing. Each wire member helps secure one securing portion to the drive with one end thereof.

20 Claims, 5 Drawing Sheets

RETAINING APPARATUS FOR DISK DRIVE

BACKGROUND

1. Technical Field

The present invention relates to a retaining apparatus for electronic device.

2. Description of Related Art

Disk drives and other peripheral electronic components are frequently mounted on a carrier that can be slidably inserted into a chassis. The carrier usually includes a pair of carrier rails positioned on either side thereof to match the chassis rails. A latching mechanism is usually included to latch the disk drive in the carrier. A drawback of current carriers of removable disk drives is relative large size. Additionally, the number of parts required to assemble the carriers increases the cost of the disk drive housing.

A U.S. Pat. No. 6,343,009 discloses a mounting device for mounting a data storage device in a housing of a computer enclosure. The mounting device includes a rack and a securing plate. The rack has a base wall and a pair of opposite side walls upwardly extending from opposite sides of the base wall for receiving the data storage device therein. However, the mounting device has two large components, each of which has a high manufacturing cost.

What is needed, therefore, is a retaining arrangement for a removable disk drive that is more compact than conventional retaining apparatus and is also more cost-effective achieved from fewer assembly parts.

DETAILED DESCRIPTION OF THE EMBODIMENT

Figure 1:
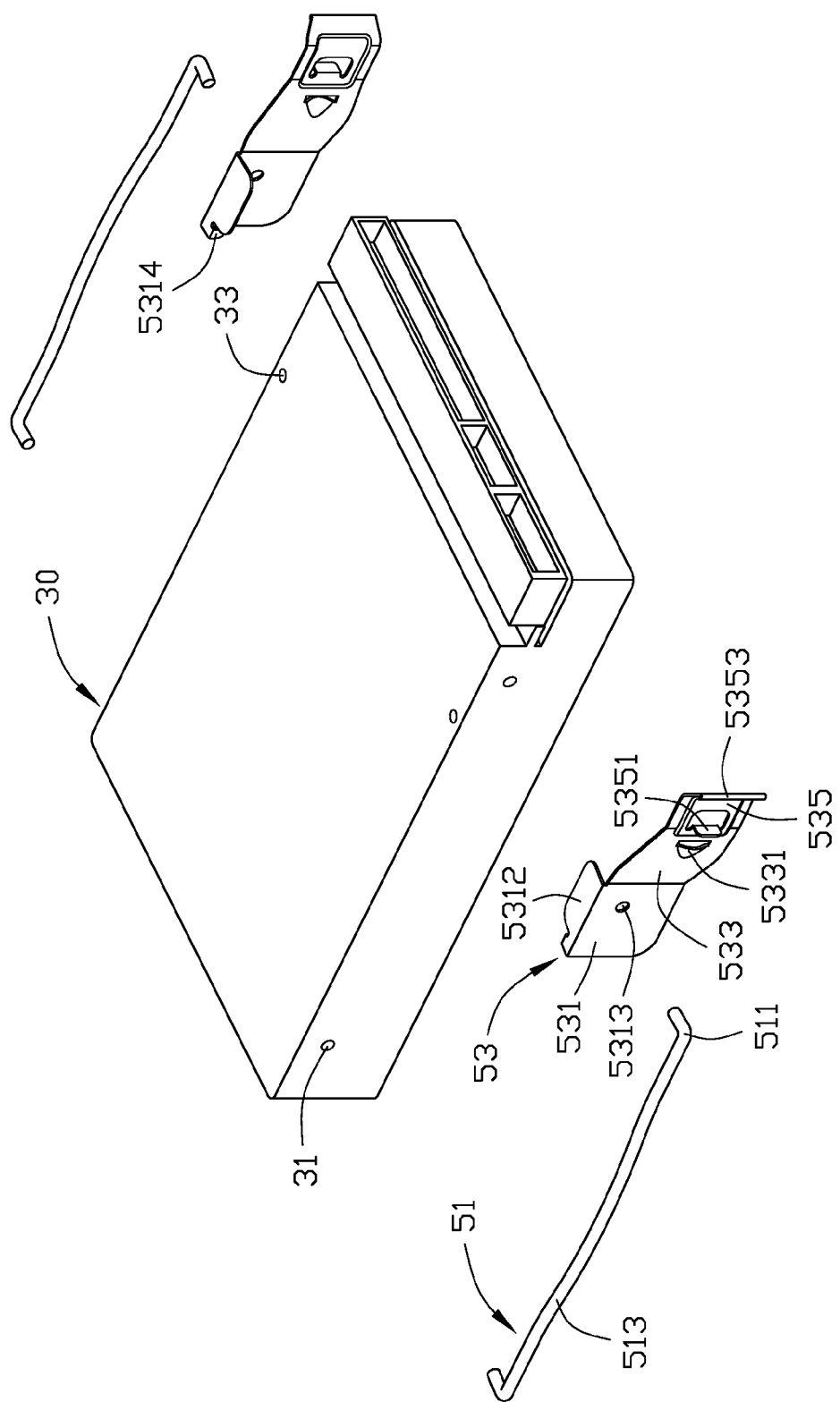
FIG. 1 is an isometric, exploded view of a disk drive and a retaining apparatus of an exemplary embodiment of the present invention.
Figure 2:
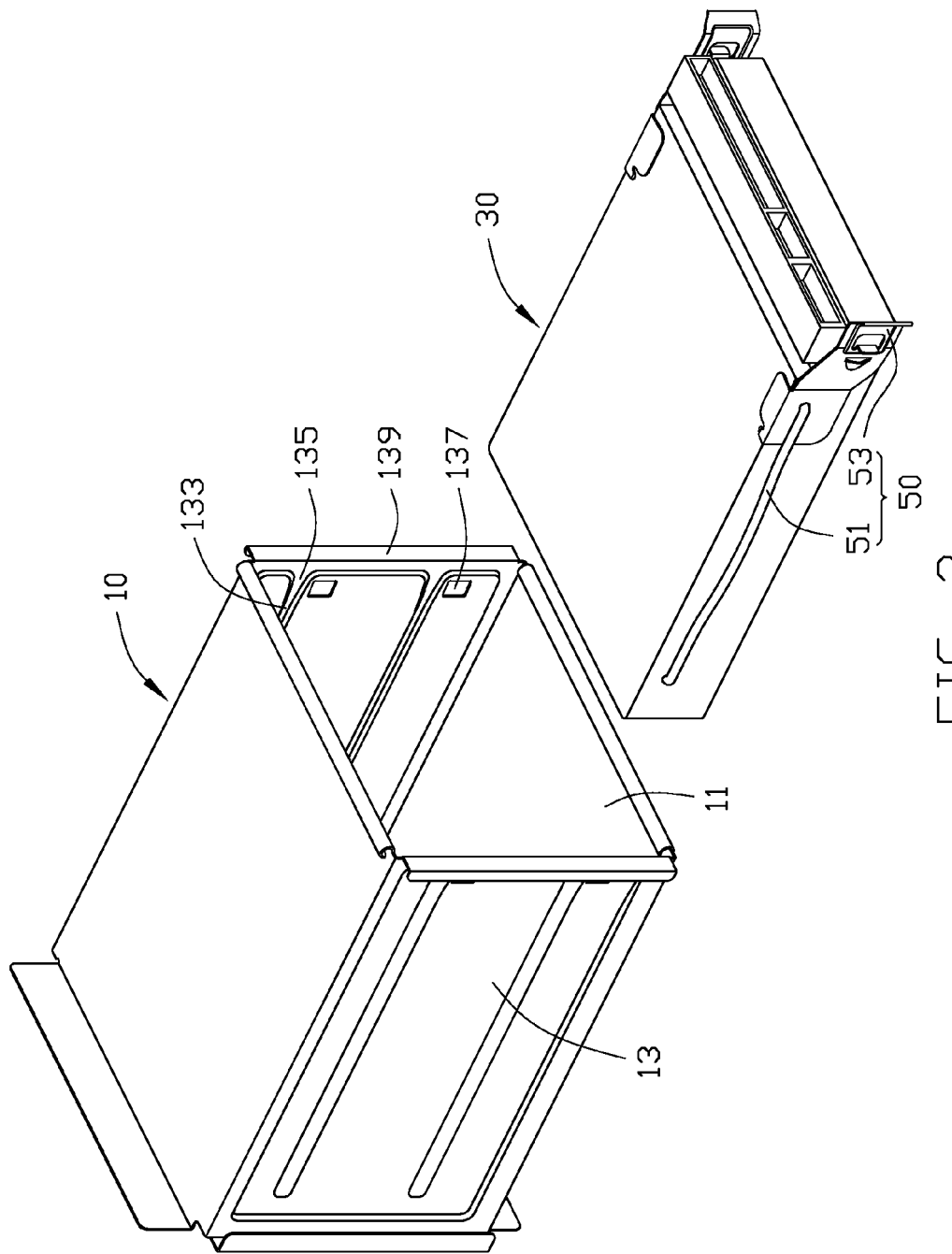
FIG. 2 is an isometric assembled view of the disk drive and the retaining apparatus of the exemplary embodiment of the present invention prior to entering a housing.

Referring to FIG. 1 and FIG. 2, a retaining apparatus 50 for retaining a disk drive 30 or other electronic component housing into a housing 10 of a computer is shown. The housing 10 includes a bottom wall 11 and a pair of parallel side walls 13. Each side wall 13 defines at least one slide way 135 in an inner side thereof. The slide ways 135 are paralleled to the bottom wall 11. An opening 137 is defined in a front side of each side wall 13 adjacent to each slide way 135. A front edge 139 extends out from the front side of each side wall 13. The disk drive 30 defines two holes 31 in each of the two parallel side walls thereof and two holes 33 at a top surface thereof.

Referring to FIG. 1, an exploded view of the retaining apparatus 50 and the disk drive 30 of an exemplary embodiment of the present invention is shown. The retaining apparatus 50 includes a pair of latch members 53 and a pair of resilient wire members 51. The latch member 53 includes a securing portion 531 and a flexible locking portion 533. The securing portion 531 defines a through hole 5313 corresponding to one of the holes 31 of the disk drive 30. An upper flange 5312 perpendicularly extends from the securing portion 531. A post 5314 protrudes downwardly on the upper flange 5312 for matching with one of the holes 33 of the disk drive 30. The flexible locking portion 533 is formed on the securing portion 531. The locking portion 533 has an operating portion 5353 at a distal end thereof. A locking tab 5331 and a blocking piece 5351 are formed on the locking portion 533 for collaboratively locking the disk drive 30 in the housing 10.

Figure 3:
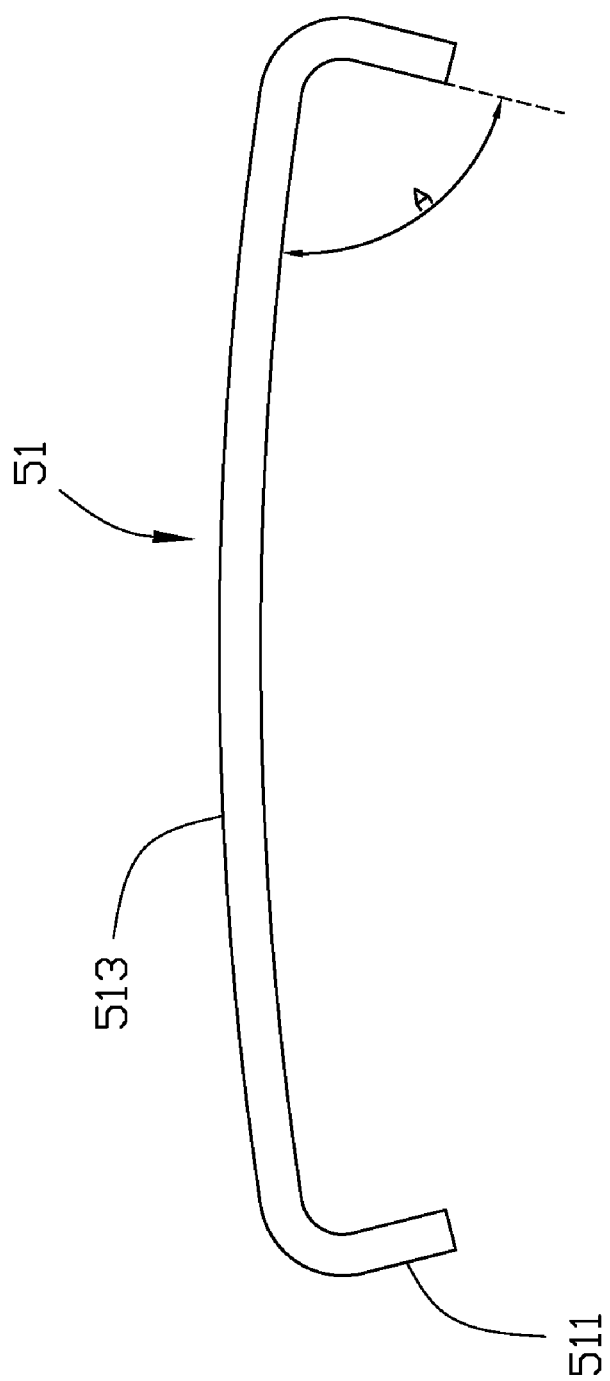
FIG. 3 is a top plan view of a wire member of the retaining apparatus of the exemplary embodiment of the present invention.

Referring also to FIG. 3, the wire member 51 includes a body portion 513 and a leg 511 at each end of the body portion 531 for inserting into the holes 31 of the disk drive 30. Referring also to FIG. 3, the body portion 513 is configured to an arcuate shape when free standing. The legs 511 are angled inward towards the body portion 513 at an angle "A", wherein "A" is less than 90 degrees and, preferably, 85 degrees.

Referring to FIG. 2, an assembled view of a disk drive assembly of the disk drive 30 and the retaining apparatus 50 of the exemplary embodiment of the present invention before they slide into the housing 10 is shown. When assembling the retaining apparatus 50 to the disk drive 30, the latch member 53 is first attached to a side wall of the disk drive 30 with the post 5314 retaining into the corresponding hole 33 of the disk drive 30. The through hole 5313 is aligned with one of the holes 31 of the disk drive 30. Next, the wire member 51 is inserted into the two holes 33 on one side wall of the disk drive 30 with one leg 511 extending through the through hole 5313 of the latch member 53. The resilient body portion 531 is forced to transform, wherein the resilient body pulls the legs 511 inward towards each other engaging the legs 511 into the interior walls of the holes 31, thereby attaching the wire member 51 and the latch member 53 to the disk drive 30 by pressing the securing portion 531 with a section of the body portion 513 of the wire member 51. The disk drive 30 is assembled with the retaining apparatus 50 on opposite sides thereof.

Figure 4:
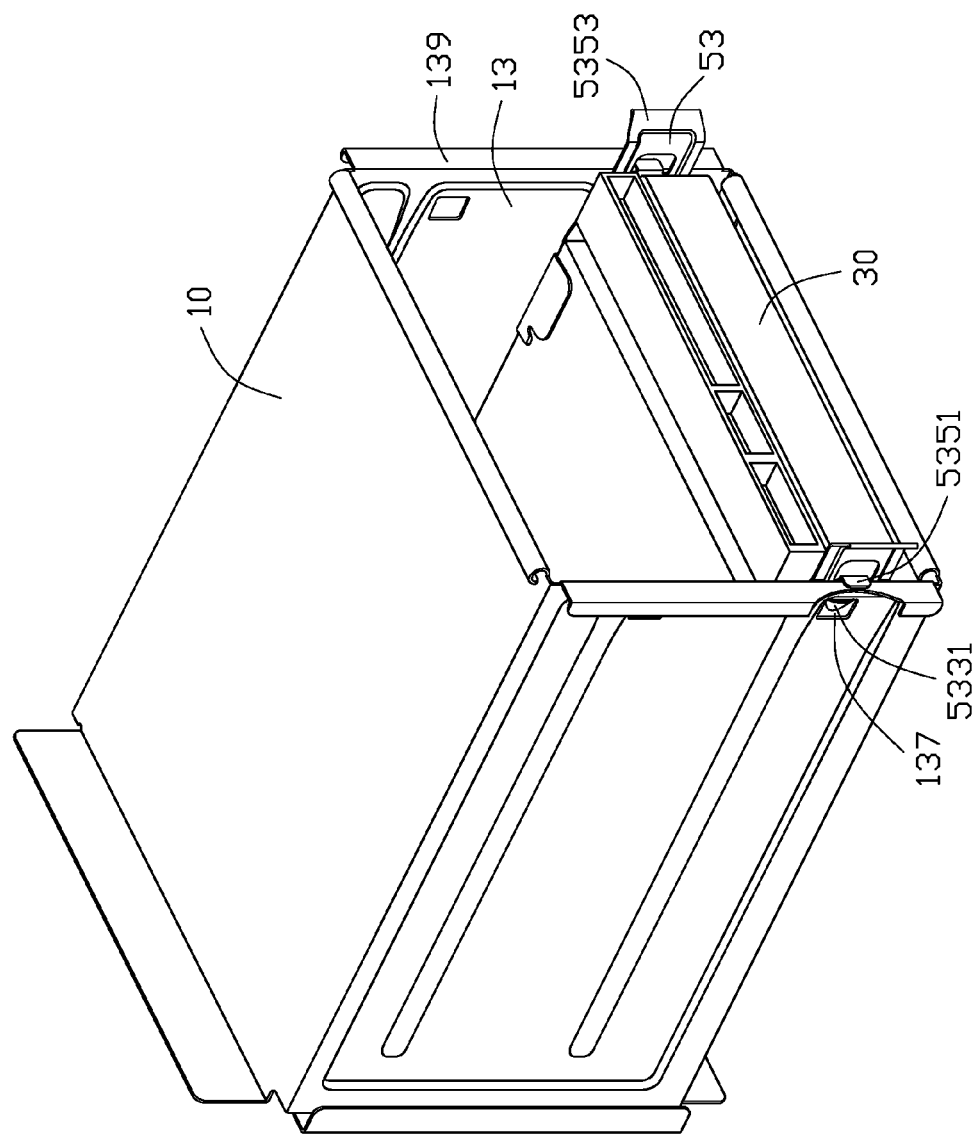
FIG. 4 is an assembled view of FIG. 2 of the exemplary embodiment of the present invention.

Referring to FIG. 4, an assembled view of disk drive assembly and the housing 10 of the exemplary embodiment of the present invention are shown. When the disk drive 10 assembly is slid into the housing 10, the body portion 513 of the wire member 51 acts as the sliding rails of the disk drive 30 and is correspondingly slid into the slide ways 135 of the housing 10. When the front edges 139 abuts on the locking portion 533 of the latch member 53, the locking portion 533 transforms inward, and the locking tab 5331 is engaged into the corresponding opening 137 of the housing 10. The blocking piece 5351 blocks on an outer side of each front edge 139 to prevent the disk drive 30 from further entry. As a result, the disk drive 30 is steadily retained in the housing 10. To remove the disk drive 30 from the housing 10, the two operating portions 5353 are pressed inwardly towards each other to disengage the locking tabs 5331 from the corresponding openings 137 of the housing 10, thereby allowing removal of the disk drive 30 from the housing 10.

Figure 5:
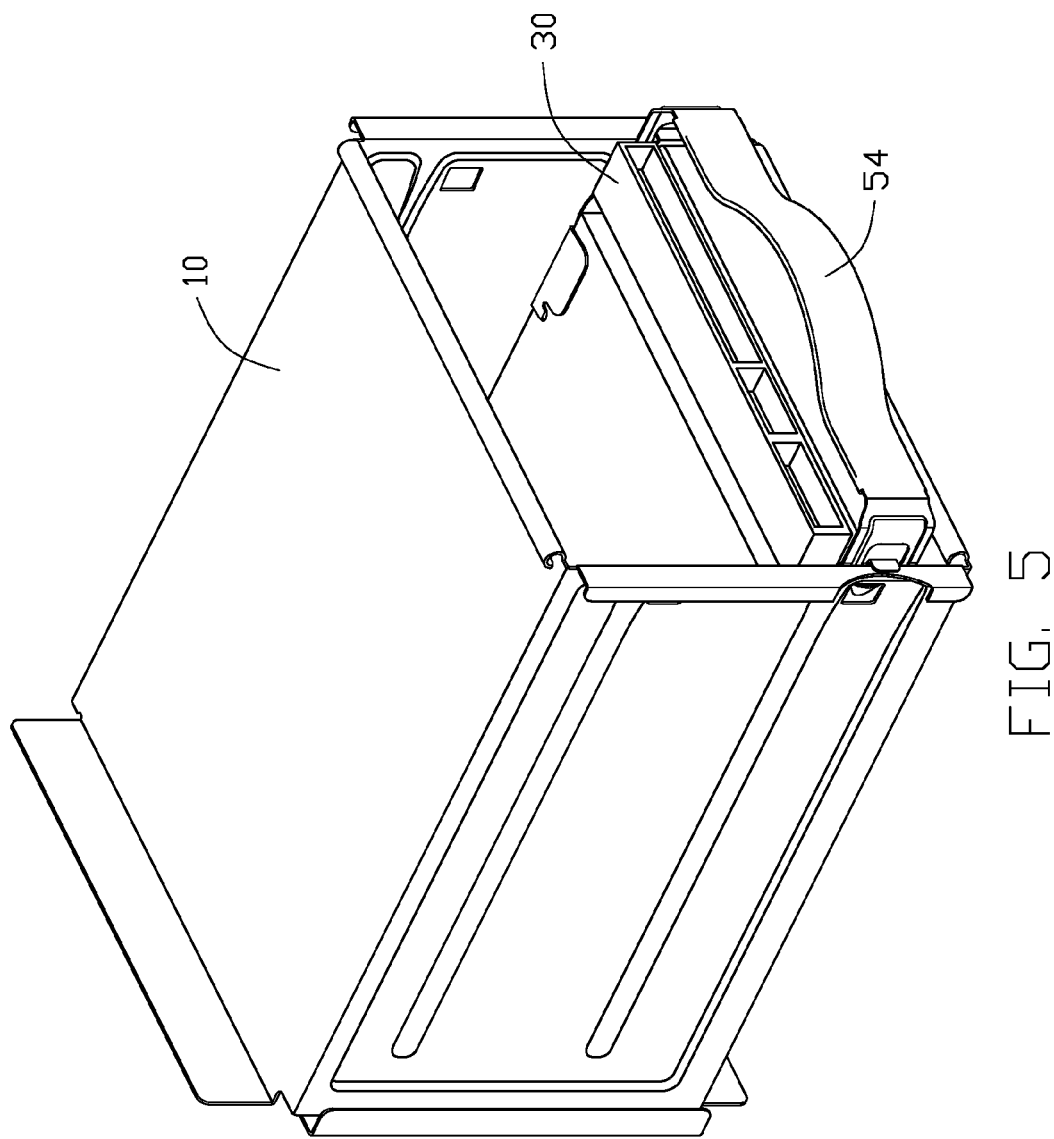
FIG. 5 is similar to FIG. 4, but showing another exemplary embodiment of the present invention.

Referring also to FIG. 5, an assembled view of the disk drive assembly and the housing 10 of another exemplary embodiment of the present invention is shown. A handle 54 is connected to the operating portions 5353 of the locking members 53 for resiliently bending the locking portions 533 inwardly towards each other to disengage the locking tab 5331 of the locking portion 533 from the housing 10.

The retaining apparatus 50 for the disk drive 30 of the present invention has the following advantages: first, the retaining apparatus 50 only has two small and compact components to slide and lock the disk drive 30 to the housing 10, thereby lowering the manufacturing cost; second, the resilient wire member 51 of the retaining apparatus 50 could absorb the unexpected shock from the housing 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining system for securing a drive within a housing, comprising:
    a drive;
    a housing;
    a pair of wire members formed of resilient material, the wire members attached to opposite sides of the drive; and
    a pair of latch members, each latch member comprising a securing portion and a flexible locking portion; the locking portion extending from the securing portion and away from the drive; and a locking tab, formed on the locking portion, that engages the housing,
    wherein each wire member helps secure one securing portion to the drive with one end thereof, and each wire secures to the drive directly with an opposite end thereof; wherein each wire member comprises a body portion and two legs at opposite ends of the body portion; the securing portion of the latch member secured by only one of the two legs extending therethrough.

2. The retaining member as claimed in claim 1, wherein the wire member comprises a body portion and two legs at opposite ends of the body portion, and the body portion is capable of slidably engaging with a slide way defined in a side wall of the housing.

3. The retaining member as claimed in claim 2, wherein the legs of the each wire member are removably received in two holes that are defined in the drive, and a first leg is inserted through the securing portion and engaged in one of the two holes.

4. The retaining member as claimed in claim 1, further comprising a handle connecting to the pair of latch members, and the handle is capable of resiliently bending the locking portions inwardly towards each other to disengage the locking tab from the housing.

5. The retaining member as claimed in claim 1, wherein a blocking piece is formed on the locking portion, and the blocking piece and the locking tab lock the drive with the housing.

6. The retaining member as claimed in claim 1, wherein a post protrudes from the securing portion and engages a top hole located on a top surface of the drive.

7. The retaining member as claimed in claim 1, wherein each latching member has an operating portion, and the latching member is capable of being pressed inwardly towards to each other to disengage the locking tabs from the housing.

8. The retaining member as claimed in claim 1, wherein a handle is connected to the latch members, and the handle is capable of resiliently bending the locking portions inwardly towards each other to disengage the locking tab from the housing.

9. A retaining apparatus for locking a drive within a housing, comprising:
    a pair of wire members formed of resilient material and slidably received in the housing, the wire member comprising a body portion and two legs at opposite ends of the body portion, and
    a pair of latch members, each latch member comprising a securing portion and a flexible locking portion, the locking portion extending from the securing portion, and a locking tab formed on each locking portion that engages the housing, the securing portion of the latch member secured by only one of the two legs extending therethrough.

10. The retaining member as claimed in claim 9, further comprising a handle connecting to the pair of latch members, and the handle is capable of resiliently bending the locking portions inwardly towards each other to disengage the locking tab from the housing.

11. The retaining member as claimed in claim 9, wherein a blocking piece is formed on the locking portion of the latch member.

12. The retaining member as claimed in claim 9, wherein a post protrudes from the securing portion.

13. A drive assembly being insertable into a housing, the drive assembly comprising:
    a drive defining two side holes in one side thereof;
    a wire member comprising a body portion and two legs at both ends of the body portion, the two legs angled towards each other at an angle less than 90 degrees, the body portion is biased so that legs exert force against interior walls of the side holes to secure the wire member to the drive; and
    a latch member comprising a securing portion and a flexible locking portion, the securing portion is in contact the drive, and the locking portion extending from the securing portion away from the drive; wherein the two legs of the wire member are at opposite ends of the body portion; the securing portion of the latch member secured by only one of the two legs extending therethrough.

14. The drive assembly as claimed in claim 13, wherein the body portion is capable of slidably engaging with a slide way defined in a side wall of the housing.

15. The drive assembly as claimed in claim 13, further comprising a handle connecting to the pair of latch members, and the handle is capable of resiliently bending the locking portions inwardly towards each other to disengage the locking tab from the housing.

16. The drive assembly as claimed in claim 13, wherein a locking tab and blocking piece are formed on the locking portion, and the blocking piece and the locking tab are capable of locking the drive with the housing.

17. The drive assembly as claimed in claim 13, wherein the securing portion is attached to the side of drive, and a post protrudes from the securing portion and engages a top hole located on a top surface of the drive.

18. The drive assembly as claimed in claim 13, wherein the securing portion has a through hole and one of the two legs extends through the through hole and into one of the two side holes.

19. The retaining member as claimed in claim 2, wherein the two legs are angled towards each other at an angle less than 90 degrees.

20. The retaining member as claimed in claim 9, wherein the two legs are angled towards each other at an angle less than 90 degrees.

* * * * *